Feb. 6, 1940.  F. E. SCHULTZ  2,189,683
TIRE TOOL
Filed Jan. 24, 1939
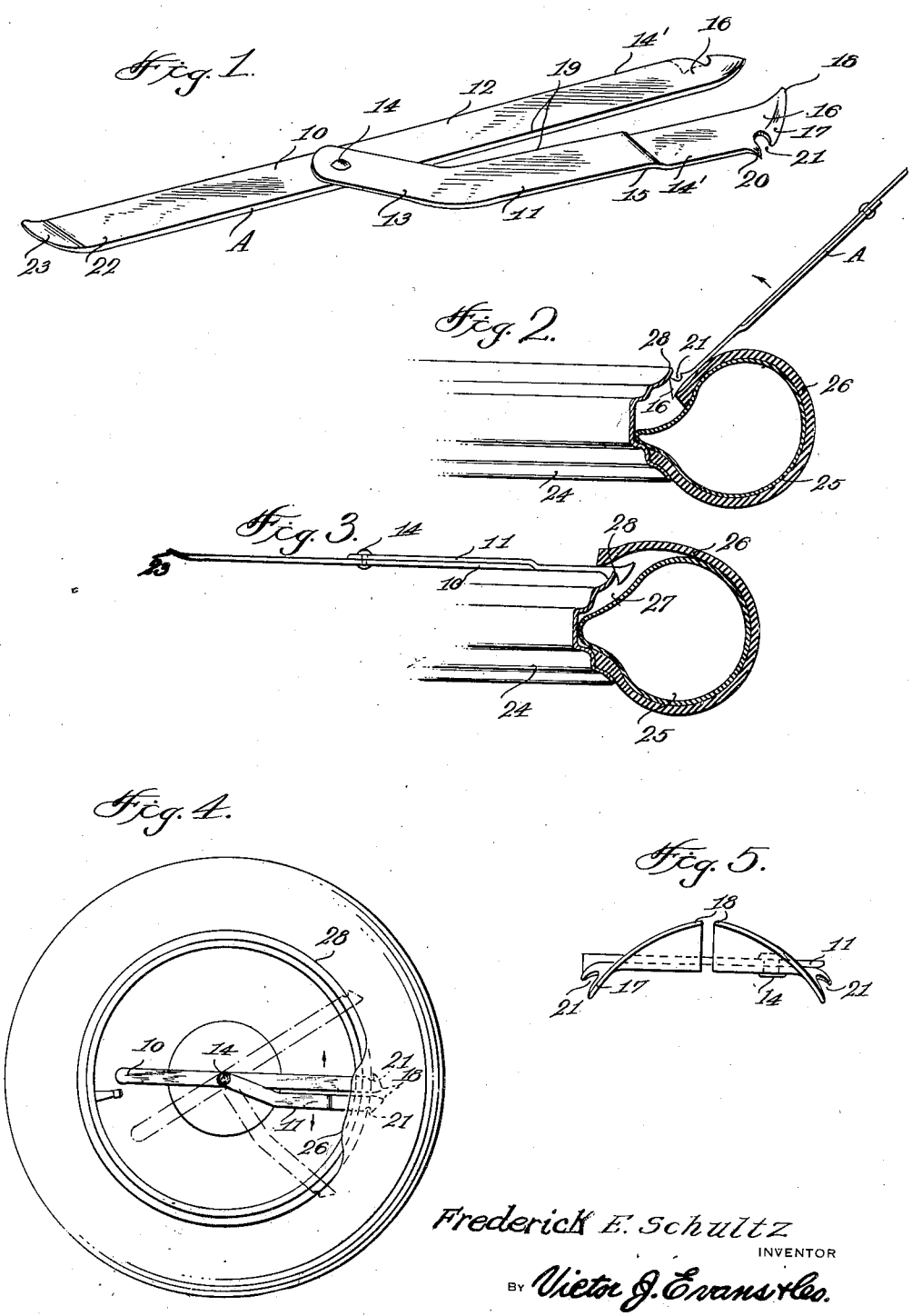
Frederick E. Schultz
INVENTOR
BY Victor J. Evans & Co.
ATTORNEYS Patented Feb. 6, 1940

2,189,683

UNITED STATES PATENT OFFICE 2,189,683

TIRE TOOL

Frederick E. Schultz, Decatur, Ill.

Application January 24, 1939, Serial No. 252,659

2 Claims. (Cl. 157—6)

The invention relates to a tire tool and more especially to a tool for placement and removal of tire casings of pneumatic tire type to and from wheel rims.

The primary object of the invention is the provision of a tool of this character, wherein a casing of a tire can be readily and easily removed from and placed upon the rim of a wheel in a minimum period of time or quickly without requiring excessive labor on the part of a user of a tool.

Another object of the invention is the provision of a tool of this character, wherein the construction is novel and is readily and easily manipulated for its application and removal at the start and ending of operation, the tool being adjustable and is adaptable for use in the applying and removal of different types of tires and rims.

A further object of the invention is the provision of a tool of this character, which is simple in its construction, thoroughly reliable and efficient in operation, compact, easily stored without occupying excessive space, strong, durable, and inexpensive to manufacture.

With these and other objects in view, the invention consists in the features of construction, combination and arrangement of parts as will be hereinafter more fully described, illustrated in the accompanying drawing, which discloses the preferred embodiment of the invention and pointed out in the claims hereunder appended.

In the accompanying drawing:

Figure 1 is a perspective view of a tool constructed in accordance with the invention.

Figure 2 is a fragmentary sectional view taken through a wheel rim and tire showing the tool in initial position for effecting removal of the casing from the rim.

Figure 3 is a similar view showing the tool at the end of a stroke movement thereof with a portion of the side of the casing free from the rim.

Figure 4 is a plan view with the tool shown by full lines in the position illustrated in Figure 3 and by dotted lines in an adjusted spread position.

Figure 5 is an enlarged end view of the tool.

Similar reference characters indicate corresponding parts throughout the several views in the drawing.

Referring to the drawing in detail, A designates generally a tool constructed in accordance with the invention, comprising a pair of members 10 and 11, respectively. The member 10 is in the form of a bar of greater length than the member 11 and for its major extent is straight with opposite flat faces 12. The member 11 is formed with a laterally turned end 13 pivoted at 14 to the member 10 for relative swinging movements of said members 10 and 11. The member 11 for a major extent, by the turned end 13, is offset to the member 10 so that when these members are brought together the major portion of the member 11 will be disposed parallel with and next to the member 10, which is the normal position of the same.

The members 10 and 11 are formed with work-engaging ends 14' matching each other and the end 14' of the member 11 is disposed in the same plane with the end 14' of the member 10 by a bight 15 provided in the member 11.

The ends 14' are formed with reversely curved and reversely rounded claw or prying tips 16, the curvatures 17 presenting noses 18 protruding outwardly at one side of each member 10 and 11 next to the approaching side edges 19 of said members and heels 20 protruding from the other side next to the outer edge of each of said members 10 and 11 so that these tips 16 will effect lifting cams in the use of the tool in a manner presently described. The tips 16 when together are in arched relation to each other, as is shown in Figure 5 of the drawing.

In the ends 14' and within the heels 20 of the tips 16 are fulcruming and holding notches 21 for the said ends as will be hereinafter fully described.

The end 22 of the member 10 is rounded and curved outwardly at one side of said member, as at 23, being a blunt knife edge-like single plying tip or claw.

In the use of the tool of the construction hereinbefore set forth, it is first necessary to place the rim of a wheel, a portion thereof being indicated at 24, upon a support or foundation to lie sidewise thereon. Thereafter, an operator partially or wholly deflates the inner tube of a tire, a portion of this tube being indicated at 25 and its casing at 26, respectively. Thereafter, by treading upon the casing 26 at the uppermost side thereof it can be broken away from the rim 24 circumferentially thereof, particularly when the casing has stuck in the seating channel 27 in said rim. In this way the tire will be loosened upon the rim 24. Now in this condition of the tire broken away from the rim 24 the tool with the members 10 and 11 brought together is disposed so that the tips 16 can be inserted between the outermost side of the tire casing 26 and the flange next thereto of the rim 24, the flange being indicated at 28, so that the notches 21 will be in confronting relation to the edge of the flange 28 and by swinging the tool A from the initial position for insertion thereof as before stated inwardly toward the hub of the wheel the edge 28 of the rim 24 will be engaged in the notches 21 of the tips 16. This engagement of the edge 28 of the rim 24 in the notches 21 locks the tool A from displacement during the swinging movement thereof with respect to the rim 24 and at the same time the said tool is fulcrumed on the rim 24 causing a portion of the side of the tire casing 26 to be lifted clear and over an adjacent area of the flange 28 of the rim 24, as is shown in Figure 4 of the drawing. Now by spreading the members 10 and 11 apart causing the ends 14 to separate from each other to the position as shown in said Figure 4 of the drawing, the tips 16 will effect a cam action on the tire casing for a continued freeing of the side thereof acted upon by the tool from the rim 24 and in this way the tire casing will be removed from the rim with dispatch. The members 10 and 11 can be spread apart by the use of a hammer striking the same after a slight opening thereof with relation to each other by a hammer or otherwise.

In the placement of a tire casing 26 upon the rim 24, the tool A is operated reversely to the steps of operation hereinbefore set forth, the tips 16 in a spread-out position are inserted between the flange 28 and the side of the tire casing 26 overhanging and next to said flange of the rim 24 so that upon outward swinging of the tool the tips 16 are brought together when the edge 28 of the rim 24 is engaged in the notches 21, the side of the casing being carried into the channel or groove 27 for the seating of the casing therein upon the rim 24.

In the use of the tool A for the removal of the tire from the rim, the members 10 and 11 can be spread away from each other approximately the full extend of a circle scribed by the swinging of the arms apart and in this way quick freeing of the side of the tire casing 26 from the flange 28 next thereto of the rim 24 can be had and without liability of damage to the inner tube 25 through the use of a single plying tool as commonly employed for the removal of tire casings from rims.

The noses 18 of the tips 16 avoid the slipping of the side of the tire casing 26 off of the tip under cam activity of the said tips of the members 10 and 11 when the same are spread apart or separated from each other during the removal operation of the tire from the rim of a wheel.

The tip 23 of the tool A is serviceable as a single prying tip where it becomes necessary to pry the side of a tire casing at a particular point when sticking to the flange of the rim 24 of a wheel.

On the initial separation of a portion of the side of a tire casing 26 from the flange 28 next thereto of a rim 24 by spreading the members 10 and 11 of the tool apart, this separation operation can be continued circumferentially of the wheel.

The tips 16 of the ends 14, by reason of the curvatures thereof, assure cam action against the bead edge of the side of the tire casing A when removing the same from the rim 24 of the wheel. In this manner the side of the tire casing 26 will be lifted from within the channel 27 in the rim 24 over the flange 28 of the said rim 24 and when the side of the tire acted upon has been completely lifted the casing 26 can then readily be taken off of the wheel.

What is claimed is:

1. A tool of the kind described comprising connected relatively movable flat-faced members disposed in side by side edge relation to each other, and outturned reversed laterally curved matched tips formed on the members for effecting reversely acting cams and having notches therein at the outermost side edges of the said tips, following the curvatures thereof and opening through the lowermost edges of the latter for receiving a rim edge of a vehicle wheel, one of the members being longer than the other with the tips next to each other.

2. A tool of the kind described comprising connected relatively movable flat-faced members disposed in side by side edge relation to each other, outturned reversed laterally curved matched tips formed on the members for effecting reversely acting cams and having notches therein at the outermost side edges of the said tips, following the curvatures thereof and opening through the lowermost edges of the latter for receiving a rim edge of a vehicle wheel, one of the members being longer than the other with the tips next to each other, and a bight formed in one member for disposing it in the same plane with the other member at the tips of both members.

FREDERICK E. SCHULTZ.